(12) United States Patent
Ullah et al.

(10) Patent No.: US 11,122,419 B2
(45) Date of Patent: Sep. 14, 2021

(54) INITIAL NETWORK CONNECTIVITY FOR A TERMINAL DEVICE

(71) Applicant: Telefonaktiebolaget LM Ericsson (publ), Stockholm (SE)

(72) Inventors: Kazi Wali Ullah, Espoo (FI); Vesa Lehtovirta, Espoo (FI); Patrik Salmela, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/611,633

(22) PCT Filed: May 10, 2017

(86) PCT No.: PCT/EP2017/061140
§ 371 (c)(1),
(2) Date: Nov. 7, 2019

(87) PCT Pub. No.: WO2018/206097
PCT Pub. Date: Nov. 15, 2018

(65) Prior Publication Data
US 2020/0169868 A1    May 28, 2020

(51) Int. Cl.
*H04W 8/18* (2009.01)
*H04W 8/20* (2009.01)
(Continued)

(52) U.S. Cl.
CPC .......... *H04W 8/183* (2013.01); *H04W 8/205* (2013.01); *H04W 12/04* (2013.01); *H04W 12/06* (2013.01); *H04W 12/35* (2021.01); *H04W 12/72* (2021.01)

(58) Field of Classification Search
CPC ............. H04W 8/183; H04W 12/0023; H04W 12/00514; H04W 8/205; H04W 12/04; H04W 12/06; H04W 12/00518
(Continued)

(56) References Cited

U.S. PATENT DOCUMENTS

| 10,701,550 B2 * | 6/2020 | Park ........................ H04W 8/20 |
| 2014/0004827 A1 * | 1/2014 | O'Leary ................. H04W 8/22 455/411 |

(Continued)

FOREIGN PATENT DOCUMENTS

KR    2013/0012220 A    2/2013

OTHER PUBLICATIONS

International Search Report and Written Opinion of the International Searching Authority, PCT/EP2017/061140, dated Jun. 29, 2017, 15 pages.
(Continued)

*Primary Examiner* — Hirdepal Singh
(74) *Attorney, Agent, or Firm* — Sage Patent Group

(57) ABSTRACT

There is provided mechanisms for obtaining initial cellular network connectivity. A method is performed by a terminal device. The method comprises obtaining an activation code for a network subscription and MNO specific information. The method comprises identifying at least one MNO from the MNO specific information. The method comprises wirelessly authenticating with an MNO node of one of the at least one identified MNO by using the MNO specific information to obtain the initial cellular network connectivity.

21 Claims, 4 Drawing Sheets

(51) Int. Cl.
*H04W 12/04* (2021.01)
*H04W 12/06* (2021.01)
*H04W 12/30* (2021.01)
*H04W 12/72* (2021.01)

(58) Field of Classification Search
USPC .......................................................... 455/411
See application file for complete search history.

(56) References Cited

U.S. PATENT DOCUMENTS

| | | |
|---|---|---|
| 2015/0349825 A1 | 12/2015 | Lee et al. |
| 2015/0350881 A1 | 12/2015 | Weiss et al. |
| 2016/0050557 A1 | 2/2016 | Park et al. |
| 2016/0174065 A1 | 6/2016 | Li et al. |
| 2016/0174069 A1 | 6/2016 | Bruner et al. |
| 2019/0104401 A1* | 4/2019 | Park .................... H04W 8/20 |
| 2019/0208405 A1* | 7/2019 | Park .................... H04W 12/45 |
| 2019/0268757 A1* | 8/2019 | Yi ....................... H04W 76/10 |
| 2020/0059778 A1* | 2/2020 | Li ........................ H04W 4/50 |

OTHER PUBLICATIONS

Huawei, Hilsilicon, Deutsche Telekom AG, "Secure Mechanism to Achieve Remote Credential Provisioning for IoT devices", 3GPP TSG SA WG3 (Security) Meeting #84, Jul. 25-29, 2016, Chennai, India, S3-161000, 4 Pages.
GSM Association, Official Document SGP .22—RSP Technical Specification, Version 2.0, Oct. 14, 2016, pp. 1-229.
Office Action dated Feb. 3, 2021 for Indian Patent Application No. 2019170412526, 6 pages.

\* cited by examiner

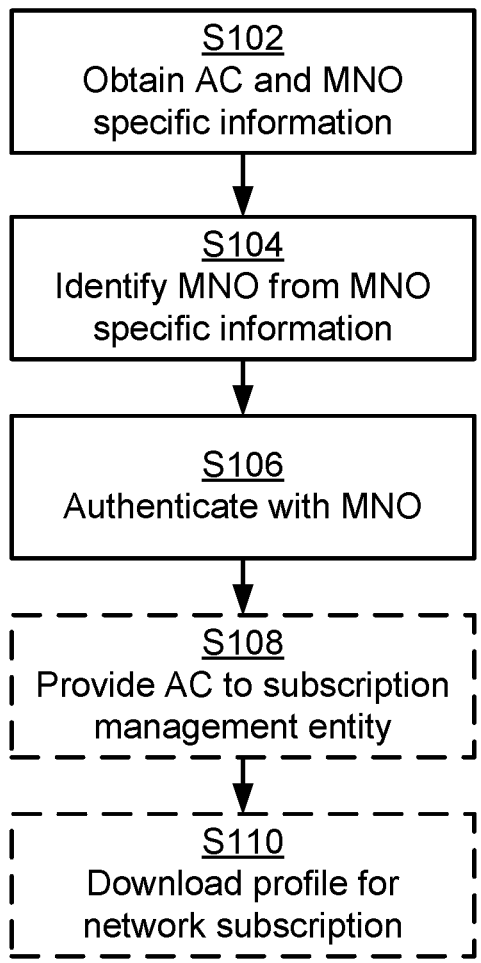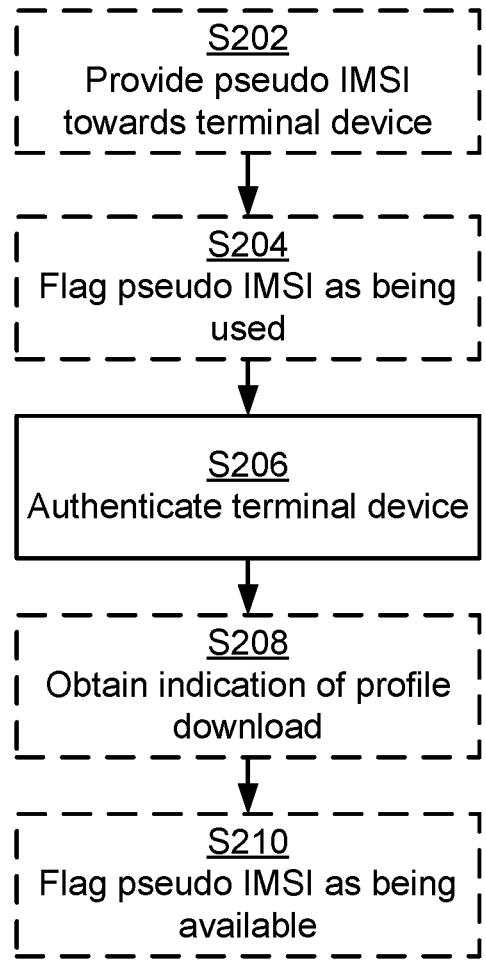
Fig. 2
Fig. 3

INITIAL NETWORK CONNECTIVITY FOR A TERMINAL DEVICE

This application is a 35 U.S.C. § 371 national stage application of PCT International Application No. PCT/EP2017/061140 filed on May 10, 2017, the disclosure and content of which is incorporated by reference herein in its entirety.

TECHNICAL FIELD

Embodiments presented herein relate to a method, a terminal device, a computer program, and a computer program product for obtaining initial cellular network connectivity. Embodiments presented herein further relate to a method, an MNO node, a computer program, and a computer program product for providing initial cellular network connectivity to the terminal device.

BACKGROUND

Mobile networks are being used to connect all sorts of devices; automated reading of utility meters, intelligent connectivity of cars and commercial vehicles to enable drivers to access navigation, infotainment or breakdown services, traffic lights, home security and assisted living.

A subscriber identity module or subscriber identification module (SIM) is an integrated circuit chip that is intended to securely store the international mobile subscriber identity (IMSI) number and its related key, as well as other information relevant for the subscription, which is used to identify and authenticate subscriptions on the devices. The SIM circuit is part of the function of a Universal Integrated Circuit Card (UICC) physical smart card.

The GSM Association (GSMA), where GSM is short for Global System for Mobile communications, has released a technical specification denoted SGP.22-RSP defining remote SIM provisioning for consumer devices and a technical specification denoted SGP.02 disclosing a remote provisioning architecture for embedded UICC (eUICC), which targets machine-to-machine (M2M) type communications devices. In short, the operator uses an entity called SM-DP+/SM-DP (where SM-DP is short for Subscription Management-Data Preparation and represents a subscription management entity) for creation of SIM profiles, such as universal (U)SIM profiles, that are later installed from the SM-DP/SM-DP+ to the eUICC. For the consumer devices, the profile is installed through a Local Profile Assistant (LPA) on the consumer device to the Issuer Security Domain Profile (ISD-P) on the eUICC in the device. For the M2M devices, the SM-DP installs the profile via a separate (external) entity, SM-SR, to the ISD-P on the device.

Both above mentioned variants have the device owner obtaining a subscription for the device from the operator by providing the operator with relevant information about the device to be provisioned, optionally including eUICC ID (EID) and International Mobile Station Equipment Identity (IMEI). The subscription can be obtained from a point of sales, via a web page of the operator, or other similar methods. Section 3.1 in SGP.22 describes the profile download initiation process. It shows how the user orders a subscription from the operator, and how the operator asks the SM-DP+ to generate the matching profile. Then the operator provides the user with an activation code (AC) that the user can insert into/provide to the device to be provisioned. The device can extract the relevant information (SM-DP+ reachability information, etc.) from the activation code and then proceed to contact the SM-DP+ for downloading the profile based on the AC after mutual authentication and various security functions.

It is conventionally assumed that the device will have Internet connectivity in order to download the profile from the subscription management entity (i.e. from the SM-DP+). However, since the device initially does not comprise any profile, the device is not enabled to use a third generation partnership project (3GPP) radio access technology for downloading the profile. Therefore, the assumption is that the device will have network connectivity using some other radio access technology, such as WiFi, or via a primary device (from device point of view also using some non-3GPP radio access technology). This means that in the worst case the device has to be configured for such an additional radio access technology only for the purpose of downloading of (possibly only initial) profiles, whilst a 3GPP radio access technology then will be used for all other operations. This adds unnecessary complexity and cost to the device.

Hence, there is still a need for an improved provisioning of network subscription to devices.

SUMMARY

A particular object is therefore how to provide initial cellular network connectivity that enables efficient provisioning of network subscription to terminal devices.

According to a first aspect there is presented a method for obtaining initial cellular network connectivity. The method is performed by a terminal device. The method comprises obtaining an activation code for a network subscription and MNO specific information. The method comprises identifying at least one MNO from the MNO specific information. The method comprises wirelessly authenticating with an MNO node of one of the at least one identified MNO by using the MNO specific information to obtain the initial cellular network connectivity.

According to a second aspect there is presented a terminal device for obtaining initial cellular network connectivity. The terminal device comprises processing circuitry. The processing circuitry is configured to cause the terminal device to obtain an activation code for a network subscription and MNO specific information. The processing circuitry is configured to cause the terminal device to identify at least one MNO from the MNO specific information. The processing circuitry is configured to cause the terminal device to wirelessly authenticate with an MNO node of one of the at least one identified MNO by using the MNO specific information to obtain the initial cellular network connectivity.

According to a third aspect there is presented a terminal device for obtaining initial cellular network connectivity. The terminal device comprises processing circuitry and a storage medium. The storage medium stores instructions that, when executed by the processing circuitry, cause the terminal device to perform operations, or steps. The operations, or steps, cause the terminal device to obtain an activation code for a network subscription and MNO specific information. The operations, or steps, cause the terminal device to identify at least one MNO from the MNO specific information. The operations, or steps, cause the terminal device to wirelessly authenticate with an MNO node of one of the at least one identified MNO by using the MNO specific information to obtain the initial cellular network connectivity.

According to a fourth aspect there is presented a terminal device for obtaining initial cellular network connectivity.

The terminal device comprises an obtain module configured to obtain an activation code for a network subscription and MNO specific information. The terminal device comprises an identify module configured to identify at least one MNO from the MNO specific information. The terminal device comprises an authenticate module configured to wirelessly authenticate with an MNO node of one of the at least one identified MNO by using the MNO specific information to obtain the initial cellular network connectivity.

According to a fifth aspect there is presented a computer program for obtaining initial cellular network connectivity. The computer program comprises computer program code which, when run on processing circuitry of a terminal device, causes the terminal device to perform a method according to the first aspect.

According to a sixth aspect there is presented a method for providing initial cellular network connectivity to a terminal device. The method is performed by an MNO node. The method comprises wirelessly authenticating the terminal device for the terminal device to obtain the initial cellular network connectivity upon the terminal device using MNO specific information towards the MNO node. The MNO specific information enables the terminal device to obtain initial cellular network connectivity from the MNO node.

According to a seventh aspect there is an MNO node for providing initial cellular network connectivity to a terminal device. The MNO node comprises processing circuitry. The processing circuitry is configured to cause the MNO node to wirelessly authenticate the terminal device for the terminal device to obtain the initial cellular network connectivity upon the terminal device using MNO specific information towards the MNO node. The MNO specific information enables the terminal device to obtain initial cellular network connectivity from the MNO node.

According to an eighth aspect there is presented an MNO node for providing initial cellular network connectivity to a terminal device. The MNO node comprises processing circuitry and a storage medium. The storage medium stores instructions that, when executed by the processing circuitry, cause the MNO node to perform operations, or steps. The operations, or steps, cause the MNO node to wirelessly authenticate the terminal device for the terminal device to obtain the initial cellular network connectivity upon the terminal device using MNO specific information towards the MNO node. The MNO specific information enables the terminal device to obtain initial cellular network connectivity from the MNO node.

According to a ninth aspect there is presented an MNO node for providing initial cellular network connectivity to a terminal device. The MNO node comprises an authenticate module configured to wirelessly authenticate the terminal device for the terminal device to obtain the initial cellular network connectivity upon the terminal device using MNO specific information towards the MNO node. The MNO specific information enables the terminal device to obtain initial cellular network connectivity from the MNO node.

According to a tenth aspect there is presented a computer program for providing initial cellular network connectivity to a terminal device, the computer program comprising computer program code which, when run on processing circuitry of a MNO node, causes the MNO node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these terminal devices, these MNO nodes, and these computer programs provide efficient initial cellular network connectivity that enables efficient provisioning of network subscription to the terminal device.

Advantageously these methods, these terminal devices, these MNO nodes, and these computer programs enable the terminal device to authenticate itself to the MNO to get initial cellular network connectivity towards the subscription management entity for the terminal device to download a profile using a wireless radio access technology, such as a 3GPP radio access technology, without even having any prior network subscription for such a 3GPP radio access technology.

Advantageously these methods, these terminal devices, these MNO nodes, and these computer programs allow terminal devices only capable of wireless radio communication using a 3GPP radio access technology (or only capable of using 3GPP access authentication) to download the first profile without the need for a provisioning profile. This is especially useful for scenarios where millions, or even billions, of IoT devices only capable of wireless radio communication using a 3GPP radio access technology (or only capable of using 3GPP access authentication).

Advantageously these methods, these terminal devices, these MNO nodes, and these computer programs simplify the download of a profile compared to conventional mechanisms. This is due to the fact that in order to download a profile the terminal device needs to be operatively connected to the provisioning server, probably via Internet. To achieve this, the terminal device may, according to conventional mechanisms, need to turn on WiFi (and perform access authentication to the WiFi network, if needed) or it may need to pair with a primary device to get the Internet connectivity. The herein disclosed methods, terminal devices, MNO nodes, and computer programs remove the need for all of these steps and the terminal device is enabled to automatically connect to the MNO and start downloading the profile, even for the first profile.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 2 and 3 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
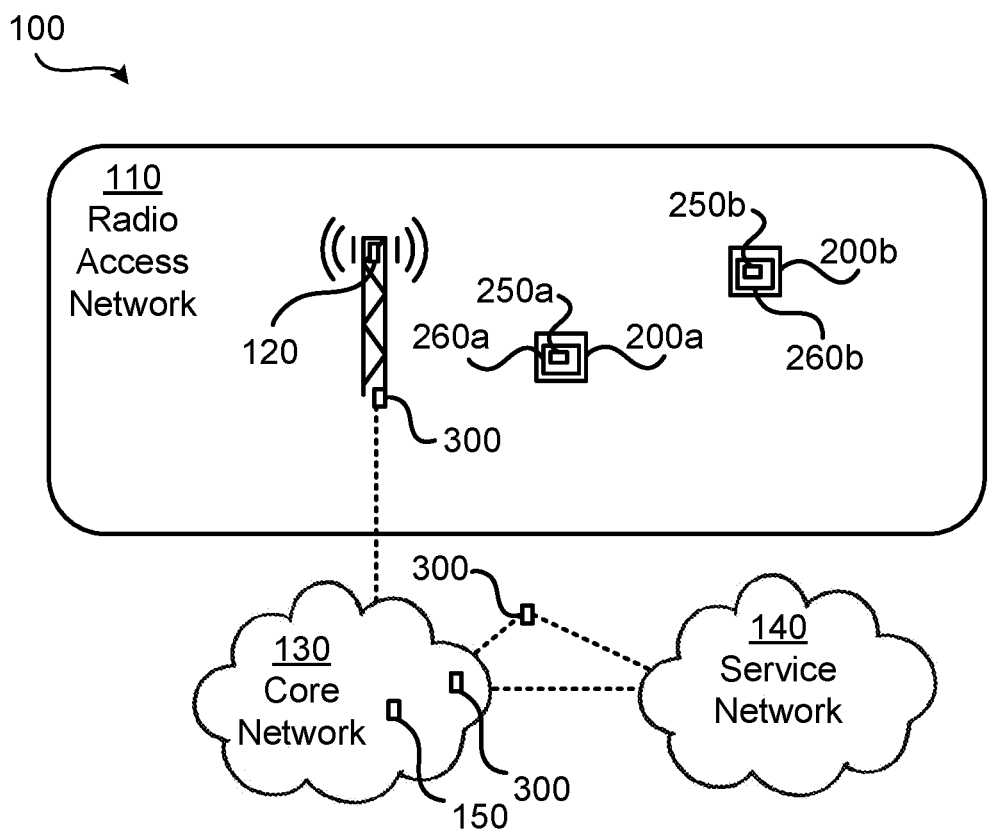
FIG. 1 is a schematic diagram illustrating a communication network according to embodiments.

FIG. 1 is a schematic simplified diagram of a communications network 100 where embodiments presented herein can be applied. The communications network 100 comprises an access network 110 (defined by an access network node 120, such as a radio base station), a core network 130, and a packet based service network 140. The core network 130 operatively connects the access network 110 with the packet based service network 140.

A terminal device 200a, 200b operatively connected to the packet based service network 140, for example via access network node 120, via WiFi, or via some other wireless or fixed-wired network access, is thereby enabled to access services and exchange data with the service network 140.

The terminal device 200a, 200b comprises a profile handling unit, which could be provided as an Issuer Security Domain Root (ISD-R) function 250a, 250b, or just ISD-R for short, and a remote subscription handling and storing unit, such as an Embedded Universal Integrated Circuit Card (eUICC), 260a, 260b. According to some aspects the ISD-R 250a, 250b is provided within the eUICC 260a, 260b. Functions of an embedded SIM (eSIM, e-SIM, or virtual SIM) circuit could be part of the function of the eUICC 260a, 260b.

At least the access network 110 and the core network 130 are operated by one or more mobile network operators (MNOs), schematically illustrated by a mobile network operator node 300.

The communications network 100 further comprises a subscription management entity iso, such as an SM-DP+. The subscription management entity 150 could be located in the core network 130, in the service network 140, or outside both the core network 130 and the service network 140; the herein disclosed embodiments are not limited to any particular location of the subscription management entity 150.

Dotted lines in FIG. 1 indicate operational connections.

At least some of the herein disclosed embodiments are based on using a 3GPP radio access network to download even the initial profile, instead of needing to use a separate radio access technology for initial Internet connectivity. Issues with conventional mechanisms for profile download to the terminal devices 200a, 200b have been disclosed above. Further aspects relating thereto will now be disclosed before presenting embodiments of the present inventive concept.

In some aspects the terminal device 200a, 200b comprises an existing profile, enabling the terminal device 200a, 200b to establish network connectivity. Such network connectivity could thus be used to download a new profile. While this is a valid assumption, it does not resolve the issue for terminal devices 200a, 200b that only comprise a radio module configured to use a 3GPP radio access technology. For the profile download of the (first) existing profile, the terminal device 200a, 200b does not have any Internet connectivity and, hence, it is not possible to download the existing profile using a 3GPP radio access technology. One option could be to install a profile (a provisional profile) during the device provisioning phase. This is not an ideal option as the device manufacturer and the device owner may have altogether different choices of MNO. Further, the device manufacturer has to know in which country the terminal device 200a, 200b is going to be deployed and what profile to use based on that. Furthermore, if the provisioning profile for some reason is not valid anymore after some time (e.g. manufacturer and initial connectivity provider terminate their agreement or provider goes bankrupt) the terminal device 200a, 200b is again without network connectivity for initial provisioning.

If the initial profile is not selected in a suitable way the terminal device 200a, 200b might end up with an initial profile from an MNO to which none of the available network access providers available when the network connectivity is deployed have a roaming agreement with. In this case the terminal device 200a, 200b will not obtain network connectivity for download of the initial profile. Also, even if there is a roaming agreement for one of the available access providers it might be that the roaming agreement is very costly, making the download of the first proper profile expensive, a cost which might get directed to the device manufacturer or the device owner.

The embodiments disclosed herein particularly relate to mechanisms for obtaining initial cellular network connectivity and providing initial cellular network connectivity to a terminal device 200a. In order to obtain such mechanisms there is provided a terminal device 200a, a method performed by the terminal device 200a, a computer program product comprising code, for example in the form of a computer program, that when run on processing circuitry of the terminal device 200a, causes the terminal device 200a to perform the method. In order to obtain such mechanisms there is further provided a MNO node 300, a method performed by the MNO node 300, and a computer program product comprising code, for example in the form of a computer program, that when run on processing circuitry of the MNO node 300, causes the MNO node 300 to perform the method.

FIG. 2 is a flowchart illustrating embodiments of methods for obtaining initial cellular network connectivity as performed by the terminal device 200a. FIG. 3 is a flowchart illustrating embodiments of methods for providing initial cellular network connectivity to a terminal device 200a as performed by the MNO node 300. The methods are advantageously provided as computer programs 920a, 920b.

Reference is now made to FIG. 2 illustrating a method for obtaining initial cellular network connectivity as performed by the terminal device 200a according to an embodiment.

The terminal device 200a needs to know which MNO to authenticate with and for this purpose obtains MNO specific information. The terminal device 200a further needs an activation code (AC) for the network subscription. Hence, the terminal device 200a is configured to perform step S102:

S102: The terminal device 200a obtains an AC for a network subscription and MNO specific information. Further aspects of the MNO specific information will be provided below.

The MNO specific information is used when the terminal device 200a attaches to the network and authenticates itself. The terminal device 200a thus uses the MNO specific information to know which MNO to authenticate with. Hence, the terminal device 200a is configured to perform step S104:

S104: The terminal device 200a identifies at least one MNO from the MNO specific information.

The MNO specific information will thus identify the MNO that the terminal device 200a should connect to, i.e. with which MNO the terminal device 200a should authenticate. The terminal device 200a then authenticates with an MNO node 300 of the MNO. This authentication is performed over a wireless communications link. Particularly, the terminal device 200a is configured to perform step S106:

S106: The terminal device 200a wirelessly authenticates with an MNO node 300 of one of the at least one identified MNO, by using the MNO specific information, to obtain the initial cellular network connectivity.

The wording "wirelessly authenticates" should be interpreted as the authenticating is performed over a wireless communications link, for example using a 3GPP radio access technology.

Embodiments relating to further details of obtaining initial cellular network connectivity as performed by the terminal device 200a will now be disclosed.

Examples of information that the AC could comprise are the address of the SM-DP+, the matching code and optionally the identity of the SM-DP+. There may be different ways to provide the AC and the MNO specific information. In one embodiment the MNO specific information is embedded in the AC. As proposed according to the embodiments disclosed herein the AC could be extended with the MNO specific information. In another embodiment the MNO specific information is attached to the AC. The MNO specific information can be sent separately, along with, or without, the AC.

In some aspects the AC and MNO specific information are obtained as part of a request for profile provision (such as during so-called profile download initiation where the AC is generated). Hence, according to an embodiment the AC and the MNO specific information are obtained as part of a request for provision of a profile for the network subscription.

The terminal device 200a could establish the initial cellular network connectivity to the MNO node 300 either via an access network node 120 of the MNO or via an access network node 120 of a roaming partner of the MNO. Thus, in some aspects the terminal device 200a connects to the actual MNO via a roaming partner and to the roaming partner indicates the actual MNO it wants to authenticate to. That is, according to an embodiment the MNO specific information comprises a list of roaming partners of the MNO, and the at least one MNO identified from the MNO specific information is selected from the list of roaming partners. The initial cellular network connectivity could then be established between the terminal device 200a and the MNO node 300 of the identified MNO via an MNO node of one of the roaming partners by the terminal device 200a providing the MNO specific information to the MNO node of one of the roaming partners.

Upon having obtained the initial cellular network connectivity the terminal device 200a is able to download a profile for the network subscription. The download is allowed upon the terminal device 200a providing the AC to the subscription management entity 150. Hence, according to an embodiment the terminal device 200a is configured to perform steps S108 and S1lo:

S108: The terminal device 200a provides, using the initial cellular network connectivity, the AC to the subscription management entity 150.

S110: The terminal device 200a downloads, using the initial cellular network connectivity, a profile for the network subscription from the subscription management entity 150 to the terminal device 200a in response thereto (i.e. in response to having provided the AC to the subscription management entity 150).

There could be different ways for the terminal device 200a to handle the part of the MNO specific information that enables the terminal device 200a to obtain the initial cellular network connectivity. In general terms, the MNO specific information can be handled in two different ways; by the terminal device 200a in general or by the eUICC 260a in particular. Since the eUICC 260a provides Universal Subscriber Identity Module (USIM) functionality to the terminal device 200a, the eUICC 260a could handle the MNO specific information and provide the USIM functionality towards the terminal device 200a. However, the terminal device 200a may also be able to handle the MNO specific information in order to obtain the initial cellular network connectivity for the terminal device 200a.

According to an embodiment the terminal device 200a comprises an UICC, and the method for obtaining initial cellular network connectivity is performed by the UICC. The UICC could be an eUICC 260a. According to an embodiment the terminal device 200a comprises a USIM function, and the method for obtaining initial cellular network connectivity is performed by the USIM function.

Reference is now made to FIG. 3 illustrating a method for providing initial cellular network connectivity to a terminal device 200a as performed by the MNO node 300 according to an embodiment.

As disclosed above, the terminal device 200a in step S106 wirelessly authenticates with the MNO node 300. Hence, the MNO node 300 is configured to perform step S206:

S206: The MNO node 300 wirelessly authenticates the terminal device 200a for the terminal device 200a to obtain the initial cellular network connectivity upon the terminal device 200a using MNO specific information towards the MNO node 300. The MNO specific information enables the terminal device 200a to obtain initial cellular network connectivity from the MNO node 300.

Embodiments relating to further details of providing initial cellular network connectivity to a terminal device 200a as performed by the MNO node 300 will now be disclosed.

In some aspects the MNO node 300 has access to a pool of pseudo IMSIs that can be used only for profile download operations. How to define a pseudo IMSI will be disclosed below in embodiments equally applicable to the terminal device 200a and the MNO node 300. The pseudo IMSIs could have a specific prefix or be selected from a known range or set of IMSIs that the MNO knows is only for initial cellular network connectivity for profile downloads. Hence according to an embodiment the pseudo IMSI is selected from a pool of pseudo IMSI and the MNO node 300 is configured to perform (optional) step S202:

S202: The MNO node 300 provides the pseudo IMSI towards the terminal device 200a before wirelessly authenticating the terminal device 200a.

The pseudo IMSI could be provided to the terminal device 200a from the MNO node 300 either directly or via one or more intermediaries, such as via another terminal device and/or another MNO node.

In some aspects the MNO flags the pseudo IMSI and associated entry in a subscriber database as being a temporary provisioning profile. Hence according to an embodiment the MNO node 300 is configured to perform (optional) step S204:

S204: The MNO node 300 flags the pseudo IMSI as being used by the terminal device 200a.

Once the profile has been downloaded, the MNO node 300 could assign the pseudo IMSI to a new profile. Hence according to an embodiment the MNO node 300 is configured to perform (optional) steps S208 and S210:

S208: The MNO node 300 obtains an indication that a profile for the network subscription has been downloaded to the terminal device 200a.

S210: The MNO node 300 flags the pseudo IMSI as being available to be provided to another terminal device 200b.

For security reasons, the MNO node 300 should update the corresponding temporary authentication key.

Embodiments equally applicable to the terminal device 200a and the MNO node 300 will now be disclosed.

In some aspects the MNO specific information has an IMSI-like structure in order to identify the terminal device 200a to the network but should not be a regular IMSI. Particularly, since the MNO specific information should only be used for initial cellular network connectivity and for download of a profile it should not be a regular IMSI. According to an embodiment the MNO specific information comprises a Mobile Subscription Identification Number (MSIN), a Mobile Country Code (MCC), and a Mobile Network Code (MNC) of the MNO, and a temporary authentication key. The inclusion of the temporary authentication key in the MNO specific information could be optional. If included the MNO specific information itself could authenticate the terminal device 200a for the initial cellular network connectivity. Otherwise it could be required that separate authentication information is provided for this purpose. Examples of such separate authentication information are 3GPP credentials and eUICC certificates, see below.

The MSIN, the MCC, the MNC and the temporary authentication key are only to be used for cellular network connectivity authentication. The MSIN, the MCC and the MNC could thus be regarded as a pseudo IMSI. According to an embodiment the MSIN, the MCC and the MNC thus define a pseudo IMSI. That is, the MNO specific information could be provided as a pseudo-IMSI (or other type of information that identifies the MNO). Using this pseudo IMSI, the terminal device 200a could manage to identify the MNO that it should connect to and it can use the temporary authentication key to authenticate itself to the MNO. The pseudo IMSI could be indicative of only being valid for initial cellular network connectivity and for download of a profile for the network subscription to the terminal device 200a. This could be accomplished either by the IMSI having a particular format, or a certain prefix of e.g. the MSIN indicating this, or where the MNO node 300 list the IMSI as only being allowed for temporary network access. The pseudo IMSI could thus have the same structure as a regular IMSI, but can only be used for initial cellular network connectivity and should not be used for a regular subscription.

By temporary authentication key is meant that the key is to be used for cellular network connectivity authentication together with the pseudo IMSI, but should not be the same key that is eventually used by the profile to be downloaded. This is also to protect the actual key as the temporary key is not protected in the AC or in the MNO specific information. Hence, according to an embodiment the temporary authentication key to be used for cellular network connectivity authentication of the terminal device 200a is different from an authentication key to be used for a profile for the network subscription to the terminal device 200a. The temporary authentication key should be disabled with the associated pseudo IMSI as soon as the profile download completes or the downloaded profile connects to the network for the first time. The MNO is aware of the mapping between downloaded profile and temporary credentials issued with AC for that profile. Thus, the MNO node 300 could use the first authentication by the profile as an indication that the profile has been downloaded and the temporary credentials issued with the AC can be removed from the subscriber database. Alternatively, the SM-DP+ and the MNO node 300 may need to exchange messages, such as handshaking, for the MNO node 300 to obtain such a notification of profile download.

In general terms, even if the MNO specific information is attached to an AC, the MNO specific information can be related to any MNO i.e. it does not have to be from the same MNO which is providing the AC. This allows more flexibility than fixing the MNO specific information to be from the same MNO as providing the AC. For example, a third party reseller of subscriptions can receive and attach the MNO specific information to the AC from a different MNO. This is useful for scenarios where a subscription is obtained for a foreign location and the profile is to be downloaded using a local or any preferred network. This may require some kind of service license agreement between the MNO and the roaming partners. Particularly, according to an embodiment the AC is issued by an MNO, and the at least one MNO identified from the MNO specific information is independent from the MNO issuing the AC. This allows the identified MNO to be either the same or some other MNO than the MNO that generates the AC.

There could be different ways for the terminal device 200a to authenticate with the MNO node 300. Either 3GPP credentials or a certificate of the eUICC 260a can be used for this purpose. Particularly, according to an embodiment 3GPP credentials, such as 3GPP subscription credentials, are used for authenticating the terminal device 200a with the MNO node 300.

The eUICC 260a may typically already have a certificate that is signed by a certificate issuer (CI). During the authentication phase the eUICC 260a can present this certificate to the MNO node 300 which then can verify it in order to provide the initial cellular network connectivity. Particularly, according to an embodiment the terminal device 200a comprises an eUICC 260a, and a certificate of the eUICC 260a is used for authenticating the terminal device 200a with the MNO node 300 for initial cellular network connectivity.

According to an embodiment the initial cellular network connectivity is restricted to download of a profile for the network subscription from the subscription management entity 150 to the terminal device 200a. This could include limiting the network connectivity with respect to, for example, bandwidth, bytes transmitted, time used, and/or services accessible. Especially, the 3GPP credentials or the certificate of the eUICC 260a could e.g. be mapped to a specific access point name (APN) that only allows connectivity to the SM-DP+ for which the AC was generated (possibly with a very low bandwidth). The initial cellular network connectivity could be limited in a similar way as a prepaid subscription to limit the bandwidth, bytes transmitted, time used, and/or services accessible. In this way, the initial cellular network connectivity cannot be abused for any other type of communication (e.g. making calls, sending messages, downloading other data than the profile, etc.), even if the 3GPP credentials or the certificate of the eUICC 260a is obtained by a hacker.

Figure 4:
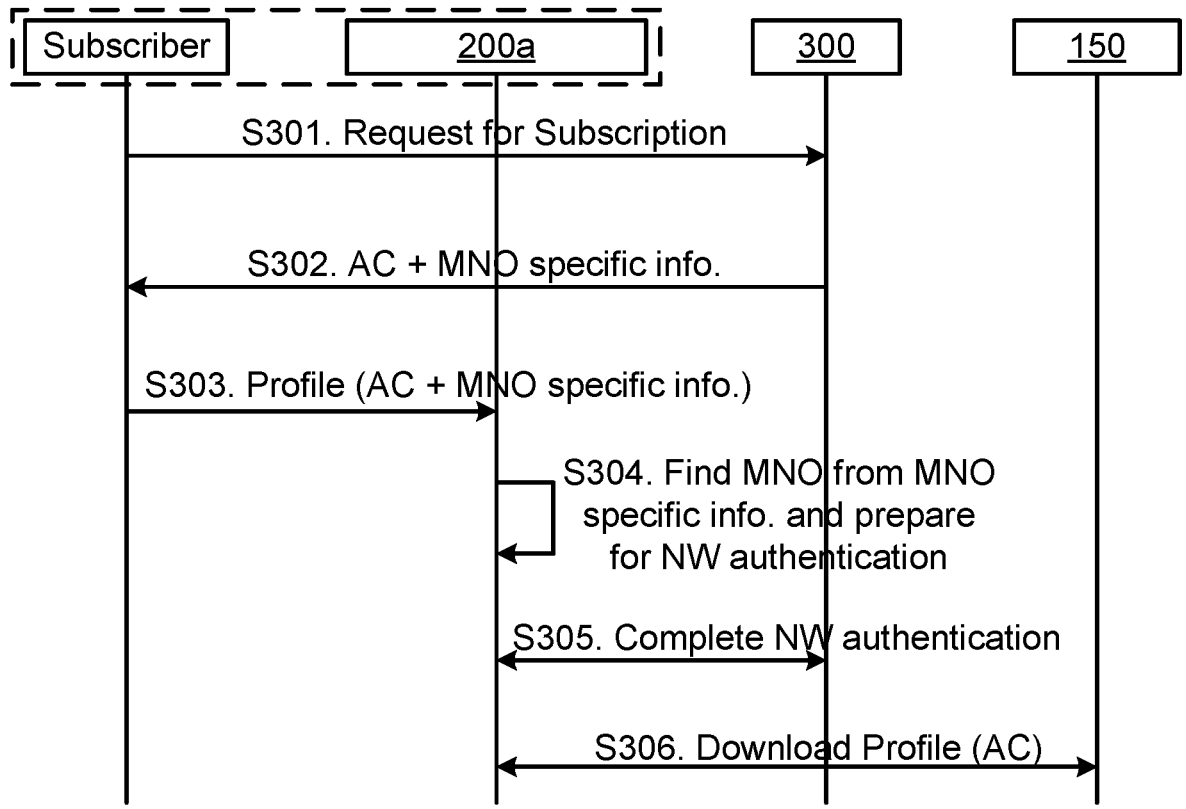
FIG. 4 is a signalling diagram according to an embodiment.

One particular embodiment for providing initial cellular network connectivity to a terminal device 200a and for the terminal device 200a to obtain such initial cellular network connectivity will now be disclosed in detail with reference to the signalling diagram of FIG. 4.

The subscriber could be represented by an entity in the terminal device 200a or could alternatively be represented by a user.

S301: The MNO node 300 receives a request for a subscription from the subscriber.

S302: The MNO responds by sending an AC and MNO specific information to the subscriber. One way to implement step S302 is to perform step S202.

S303: The terminal device 200a obtains the AC and the MNO specific information from the subscriber. One way to implement step S303 is to perform step S102.

S304: The terminal device 200a identifies at least one MNO from the MNO specific information. One way to implement step S304 is to perform step S104.

S305: The terminal device 200a wirelessly authenticate with an MNO node 300 of one of the at least one identified MNO by using the MNO specific information to obtain the initial cellular network connectivity. One way to implement step S305 is to perform step S106 and S206.

S306: The terminal device 200a downloads, using the initial cellular network connectivity, a profile for the network subscription from the subscription management entity 150 upon providing, again using the initial cellular network connectivity, the AC to the subscription management entity 150. One way to implement step S306 is to perform steps S108 and S110.

Figure 5:
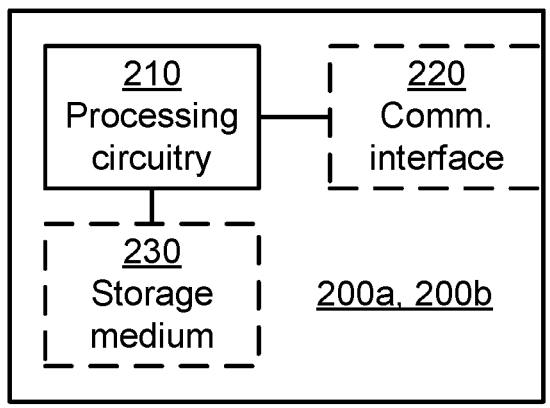
FIG. 5 is a schematic diagram showing functional units of a terminal device according to an embodiment.

FIG. 5 schematically illustrates, in terms of a number of functional units, the components of a terminal device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 910a (as in FIG. 9), e.g. in the form of a storage medium 230. The processing circuitry 210 may further be provided as at least one application specific integrated circuit (ASIC), or field programmable gate array (FPGA).

Particularly, the processing circuitry 210 is configured to cause the terminal device 200a to perform a set of operations, or steps, S102-S110, as disclosed above. For example, the storage medium 230 may store the set of operations, and the processing circuitry 210 may be configured to retrieve the set of operations from the storage medium 230 to cause the terminal device 200a to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The terminal device 200a may further comprise a communications interface 220 for communications with other entities, nodes, functions, and devices of the communications network 100. As such the communications interface 220 may comprise one or more transmitters and receivers, comprising analogue and digital components.

The processing circuitry 210 controls the general operation of the terminal device 200a e.g. by sending data and control signals to the communications interface 220 and the storage medium 230, by receiving data and reports from the communications interface 220, and by retrieving data and instructions from the storage medium 230. Other components, as well as the related functionality, of the terminal device 200a are omitted in order not to obscure the concepts presented herein.

Figure 6:
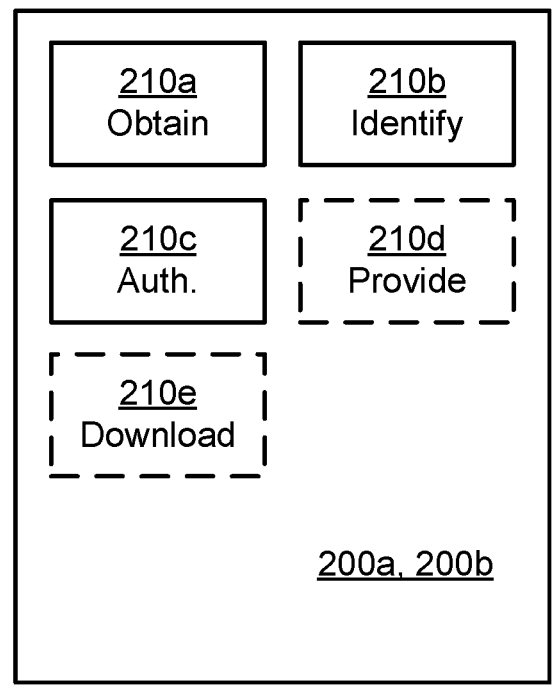
FIG. 6 is a schematic diagram showing functional modules of a terminal device according to an embodiment.

FIG. 6 schematically illustrates, in terms of a number of functional modules, the components of a terminal device 200a according to an embodiment. The terminal device 200a of FIG. 6 comprises a number of functional modules; an obtain module 210a configured to perform step S102, an identify module 210b configured to perform step S104, and an authenticate module 210C configured to perform step S106. The terminal device 200a of FIG. 6 may further comprise a number of optional functional modules, such as any of a provide module 210d configured to perform step S108, and a download module 210e configured to perform step S110. In general terms, each functional module 210a-210e may be implemented in hardware or in software. Preferably, one or more or all functional modules 210a-210e may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210e and to execute these instructions, thereby performing any steps of the terminal device 200a as disclosed herein.

Figure 7:
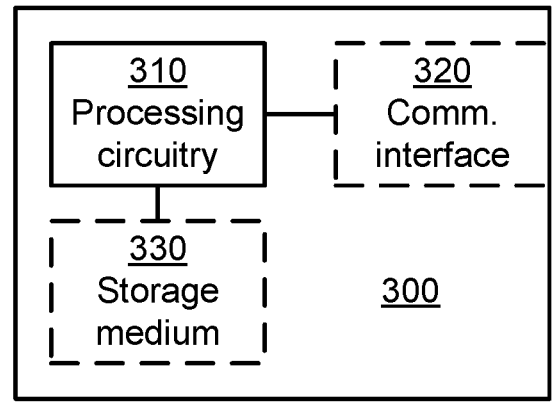
FIG. 7 is a schematic diagram showing functional units of an MNO node according to an embodiment.

FIG. 7 schematically illustrates, in terms of a number of functional units, the components of a MNO node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 910b (as in FIG. 9), e.g. in the form of a storage medium 330. The processing circuitry 310 may further be provided as at least one application specific integrated circuit (ASIC), or field programmable gate array (FPGA).

Particularly, the processing circuitry 310 is configured to cause the MNO node 300 to perform a set of operations, or steps, S202-S210, as disclosed above. For example, the storage medium 330 may store the set of operations, and the processing circuitry 310 may be configured to retrieve the set of operations from the storage medium 330 to cause the MNO node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The MNO node 300 may further comprise a communications interface 320 for communications with other entities, nodes, functions, and devices of the communications network 100. As such the communications interface 320 may comprise one or more transmitters and receivers, comprising analogue and digital components.

The processing circuitry 310 controls the general operation of the MNO node 300 e.g. by sending data and control signals to the communications interface 320 and the storage medium 330, by receiving data and reports from the communications interface 320, and by retrieving data and instructions from the storage medium 330. Other components, as well as the related functionality, of the MNO node 300 are omitted in order not to obscure the concepts presented herein.

Figure 8:
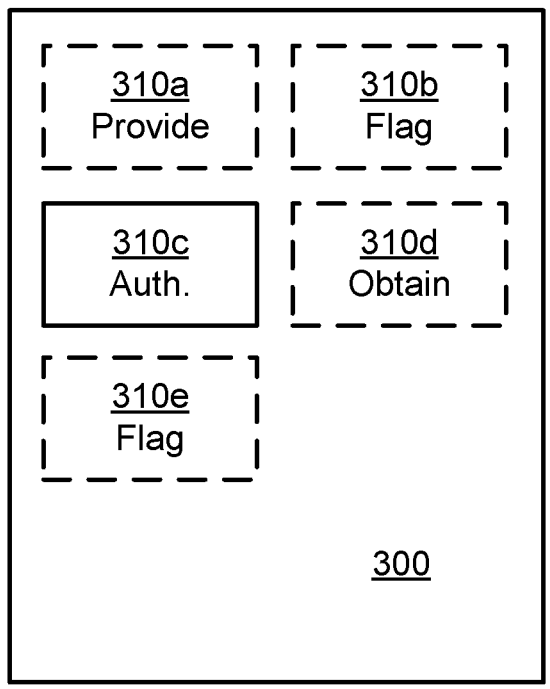
FIG. 8 is a schematic diagram showing functional modules of an MNO node according to an embodiment.

FIG. 8 schematically illustrates, in terms of a number of functional modules, the components of a MNO node 300 according to an embodiment. The MNO node 300 of FIG. 8 comprises an authenticate module 310c configured to perform step S206. The MNO node 300 of FIG. 8 may further comprise a number of optional functional modules, such as any of a provide module 310a configured to perform step S202, a flag module 310b configured to perform step S204, an obtain module 310d configured to perform step S208, and a flag module 310e configured to perform step S210. In general terms, each functional module 310a-310e may be implemented in hardware or in software. Preferably, one or more or all functional modules 310a-310e may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310e and to execute these instructions, thereby performing any steps of the MNO node 300 as disclosed herein.

The MNO node 300 may be provided as a standalone device or as a part of at least one further device. For example, the MNO node 300 may be provided in a node of the access network 110, in a node of the core network 130, in a node of the service network 140, or in a node outside these parts of the communications network 100. Alternatively, functionality of the terminal MNO node 300 may be distributed between at least two devices, or nodes.

These at least two nodes, or devices, may either be part of the same network part or may be spread between at least two such network parts. Thus, a first portion of the instructions performed by the MNO node 300 may be executed in a first device, and a second portion of the of the instructions performed by the MNO node 300 may be executed in a second device; the herein disclosed embodiments are not limited to any particular number of devices on which the instructions performed by the MNO node 300 may be executed. Hence, the methods according to the herein disclosed embodiments are suitable to be performed by an MNO node 300 residing in a cloud computational environment. Therefore, although a single processing circuitry 310 is illustrated in FIG. 7 the processing circuitry 310 may be distributed among a plurality of devices, or nodes. The same applies to the functional modules 310a-310e of FIG. 8 and the computer program 920b of FIG. 9 (see below).

Figure 9:
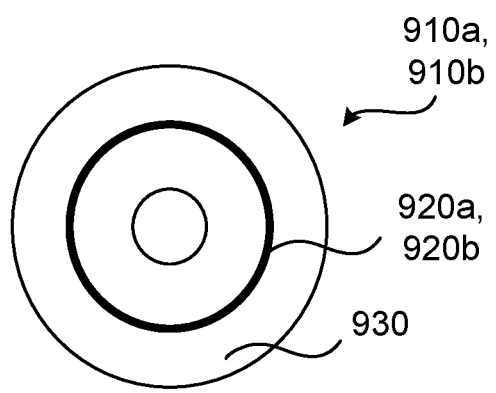
FIG. 9 shows one example of a computer program product comprising computer readable means according to an embodiment.

FIG. 9 shows one example of a computer program product 910a, 910b comprising computer readable means 930. On this computer readable means 930, a computer program 920a can be stored, which computer program 920a can cause the processing circuitry 210 and thereto operatively coupled entities and devices, such as the communications interface 220 and the storage medium 230, to execute methods according to embodiments described herein. The computer program 920a and/or computer program product 910a may thus provide means for performing any steps of the terminal device 200a as herein disclosed. On this computer readable means 930, a computer program 920b can be stored, which computer program 920b can cause the processing circuitry 310 and thereto operatively coupled entities and devices, such as the communications interface 320 and the storage medium 330, to execute methods according to embodiments described herein. The computer program 920b and/or computer program product 910b may thus provide means for performing any steps of the MNO node 300 as herein disclosed.

In the example of FIG. 9, the computer program product 910a, 910b is illustrated as an optical disc, such as a CD (compact disc) or a DVD (digital versatile disc) or a Blu-Ray disc. The computer program product 910a, 910b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 920a, 920b is here schematically shown as a track on the depicted optical disk, the computer program 920a, 920b can be stored in any way which is suitable for the computer program product 910a, 910b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for obtaining initial cellular network connectivity, the method being performed by a terminal device, the method comprising:
    obtaining an activation code (AC) for a network subscription and mobile network operator (MNO) specific information by using a cellular connection with the MNO, wherein the terminal device does not have a network subscription with the MNO;
    identifying at least one MNO from the MNO specific information; and
    obtaining the initial cellular network connectivity by wirelessly authenticating with an MNO node of one of the at least one identified MNO by using the MNO specific information.

2. The method according to claim 1, wherein the MNO specific information is embedded in the AC or attached to the AC.

3. The method according to claim 1, further comprising:
    requesting, using the cellular connection with the MNO, for provision of a profile for the network subscription when the terminal device does not have a network subscription with the MNO; and
    wherein obtaining the AC for the network subscription and the MNO specification information comprises receiving the AC and the MNO specification from the MNO in response to requesting for provision of the profile for the network subscription.

4. The method according to claim 1, wherein the MNO specific information comprises a list of roaming partners of the MNO, and wherein the at least one MNO identified from the MNO specific information is selected from the list of roaming partners.

5. The method according to claim 4, wherein the initial cellular network connectivity is established between the terminal device and the MNO node of the identified MNO via an MNO node of one of the roaming partners by the terminal device providing the MNO specific information to the MNO node of one of the roaming partners.

6. The method according to claim 1, further comprising:
providing, using the initial cellular network connectivity, the AC to a subscription management entity; and
downloading, using the initial cellular network connectivity, a profile for the network subscription from the subscription management entity to the terminal device in response thereto.

7. The method according to claim 1, wherein the terminal device comprises a Universal Integrated Circuit Card, UICC, and wherein the method for obtaining initial cellular network connectivity is performed by the UICC in the terminal device.

8. The method according to claim 1, wherein the terminal device comprises a Universal Subscriber Identity Module, USIM, function and wherein the method for obtaining initial cellular network connectivity is performed by the USIM function in the terminal device.

9. A method for providing initial cellular network connectivity to a terminal device, the method being performed by a mobile network operator (MNO) node, the method comprising:
providing, to the terminal device, an activation code (AC) for a network subscription and MNO specific information by using a cellular connection with the terminal device, wherein the terminal device does not have a network subscription with the MNO node;
providing the initial cellular network connectivity by wirelessly authenticating the terminal device to obtain the initial cellular network connectivity upon the terminal device using the MNO specific information towards the MNO node, wherein the MNO specific information enables the terminal device to obtain initial cellular network connectivity from the MNO node.

10. The method according to claim 9, wherein the MNO specific information comprises a Mobile Subscription Identification Number, MSIN, a Mobile Country Code, MCC, and a Mobile Network Code, MNC, of the MNO, and a temporary authentication key, wherein the MSIN, the MCC, the MNC and the temporary authentication key only are to be used for cellular network connectivity authentication.

11. The method according to claim 10, wherein the MSIN, the MCC and the MNC define a pseudo International Mobile Subscriber Identity, IMSI, and wherein the pseudo IMSI is indicative of only being valid for initial cellular network connectivity and for download of a profile for the network subscription to the terminal device.

12. The method according to claim 10, wherein the temporary authentication key to be used for cellular network connectivity authentication of the terminal device is different from an authentication key to be used for a profile for the network subscription to the terminal device.

13. The method according to claim 9, wherein the at least one MNO identified from the MNO specific information is independent from the MNO issuing the AC.

14. The method according to claim 9, wherein 3GPP credentials are used for authenticating the terminal device with the MNO node.

15. The method according to claim 9, wherein the terminal device comprises an embedded Universal Integrated Circuit Card, eUICC, and wherein a certificate of the eUICC is used for authenticating the terminal device with the MNO node.

16. The method according to claim 9, wherein the initial cellular network connectivity is restricted to download of a profile for the network subscription from a subscription management entity to the terminal device.

17. The method according to claim 11, wherein the pseudo IMSI is selected from a pool of pseudo IMSI, the method further comprising:
providing the pseudo IMSI towards the terminal device before wirelessly authenticating the terminal device.

18. The method according to claim 17, further comprising:
flagging the pseudo IMSI as being used by the terminal device.

19. The method according to claim 9, further comprising:
obtaining an indication that a profile for the network subscription has been downloaded to the terminal device; and
flagging the pseudo IMSI as being available to be provided to another terminal device.

20. A terminal device for obtaining initial cellular network connectivity, the terminal device comprising:
processing circuitry; and
a storage medium storing instructions that, when executed by the processing circuitry, cause the terminal device to,
obtain an activation code (AC) for a network subscription and mobile network operator (MNO) specific information by using a cellular connection with the MNO, wherein the terminal device does not have a network subscription with the MNO,
identify at least one MNO from the MNO specific information, and
obtain the initial cellular network connectivity by wirelessly authenticating with an MNO node of one of the at least one identified MNO by using the MNO specific information.

21. A mobile network operator (MNO) node for providing initial cellular network connectivity to a terminal device, the MNO node comprising:
processing circuitry; and
a storage medium storing instructions that, when executed by the processing circuitry, cause the MNO node to,
provide, to the terminal device, an activation code (AC) for a network subscription and MNO specific information by using a cellular connection with the terminal device, wherein the terminal device does not have a network subscription with the MNO;
provide the initial cellular network connectivity by wirelessly authenticating the terminal device to obtain the initial cellular network connectivity upon the terminal device using MNO specific information towards the MNO node, wherein the MNO specific information enables the terminal device to obtain initial cellular network connectivity from the MNO node.

* * * * *